(12) United States Patent
Zimmer

(10) Patent No.: US 7,583,434 B2
(45) Date of Patent: Sep. 1, 2009

(54) STEREOMICROSCOPE

(75) Inventor: Klaus-Peter Zimmer, Heerbrugg (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 130 days.

(21) Appl. No.: 11/467,455

(22) Filed: Aug. 25, 2006

(65) Prior Publication Data

US 2008/0030848 A1 Feb. 7, 2008

(30) Foreign Application Priority Data

Aug. 26, 2005 (DE) ........................ 10 2005 040 473

(51) Int. Cl.
G02B 21/22 (2006.01)
G02B 21/00 (2006.01)
(52) U.S. Cl. ........................ 359/378; 359/368; 359/376; 359/431
(58) Field of Classification Search ......... 359/368–390, 359/431, 819
See application file for complete search history.

(56) References Cited

U.S. PATENT DOCUMENTS

| 3,655,259 | A |   | 4/1972  | Miyauchi et al. |         |
|-----------|---|---|---------|-----------------|---------|
| 3,909,106 | A |   | 9/1975  | Buhler          |         |
| 4,341,435 | A | * | 7/1982  | Lang et al.     | 359/376 |
| 4,447,717 | A |   | 5/1984  | Nohda et al.    |         |
| 4,492,441 | A | * | 1/1985  | Hopkins         | 359/377 |
| 4,518,231 | A |   | 5/1985  | Muchel et al.   |         |
| 4,605,287 | A |   | 8/1986  | Lang et al.     |         |
| 4,697,893 | A | * | 10/1987 | Fehr et al.     | 359/377 |
| 4,717,246 | A | * | 1/1988  | Fehr et al.     | 359/377 |
| 4,786,154 | A |   | 11/1988 | Fantone et al.  |         |
| 4,862,873 | A |   | 9/1989  | Yajima et al.   |         |
| 4,989,078 | A |   | 1/1991  | Paxton          |         |
| 5,009,487 | A | * | 4/1991  | Reiner          | 359/376 |
| 5,603,687 | A |   | 2/1997  | Hori et al.     | 600/166 |
| 6,563,113 | B1|   | 5/2003  | Amann et al.    |         |

(Continued)

FOREIGN PATENT DOCUMENTS

CH 500500 12/1970

(Continued)

OTHER PUBLICATIONS

Zimmer, K-P., "Optical Designs for Stereomicroscopes", in *International Optical Design Conference 1998*, Proceedings of SPIE, vol. 3482, pp. 690-697 (1998).

(Continued)

*Primary Examiner*—Thong Nguyen
(74) *Attorney, Agent, or Firm*—Darby & Darby

(57) ABSTRACT

A stereomicroscope includes a first beam path and a second beam path, wherein in the first beam path a first telescope system is provided and in the second beam path a second telescope system is provided. An observation unit comprising a first and a second observation unit is also provided. At least one optical element of the first telescope system compared to at least one corresponding optical element of the second telescope system has a different optically effective diameter. Between the first telescope system and the second telescope system and the first and the second observation units a prism group is provided which can be moved in the beam path of the first telescope system with the larger diameter of the entrance pupil.

14 Claims, 7 Drawing Sheets

U.S. PATENT DOCUMENTS

| | | |
|---|---|---|
| 6,614,595 B2 | 9/2003 | Igarashi et al. |
| 6,661,572 B2 | 12/2003 | Spink et al. |
| 6,816,321 B2 | 11/2004 | Zimmer et al. ............ 359/686 |
| 2003/0210470 A1 | 11/2003 | Zimmer et al. |
| 2003/0227672 A1 | 12/2003 | Zimmer et al. |
| 2004/0085628 A1 | 5/2004 | Kawasaki et al. |
| 2004/0091259 A1 | 5/2004 | Hanzawa |
| 2004/0217259 A1 | 11/2004 | Yoneyama et al. |
| 2005/0168809 A1 | 8/2005 | Moller et al. |
| 2007/0047072 A1 | 3/2007 | Zimmer |
| 2008/0030848 A1 | 2/2008 | Zimmer |

FOREIGN PATENT DOCUMENTS

| | | |
|---|---|---|
| DE | 10222041 | 12/2003 |
| DE | 102 25 192 | 1/2004 |
| DE | 102004006066 | 8/2005 |
| EP | 1010030 | 6/2000 |
| EP | 1235094 | 8/2002 |
| WO | WO-9913370 | 3/1999 |

OTHER PUBLICATIONS

Brochure "OMI VISU 200 am Bodenstativ S8 Ophathalomologie unter neuen Aspekten", Operationsmikroskope von Carl Zeiss, pp. 1-6.

Brochure "SteREO Die neue Groesse", Mikroskopie von Carl Zeiss, pp. 1-4.

W. Klein, "Einige optische Grundlagen zu Vario-Systemen", Jahrbuch fuer Optik und Feinmechanik, 1972, Pegasus, Wetzlar, p. 63.

Co-pending U.S. Appl. No. 11/467,447, filed Aug. 25, 2006, entitled "Greenough-Type Stereomicroscope".

Non-Final Office Action mailed Feb. 13, 2009 in co-pending U.S. Appl. No. 11/467,815.

Co-pending U.S. Appl. No. 12/332,903, filed Dec. 11, 2008, entitled "Stereomicroscope".

Co-pending U.S. Appl. No. 11/467,815, filed on Aug. 28, 2006, entitled "Stereomicroscope".

\* cited by examiner

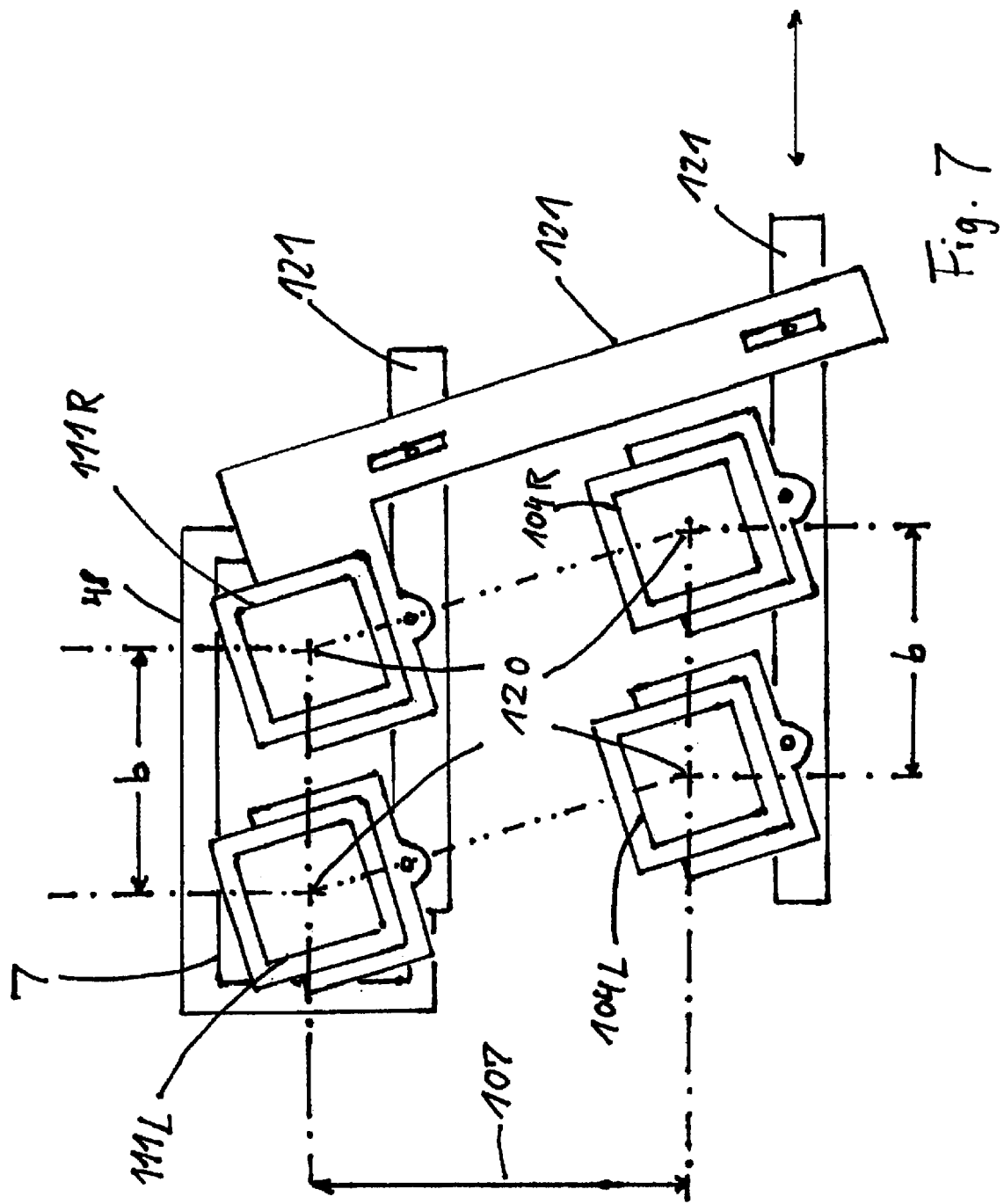

STEREOMICROSCOPE

Priority is claimed to German Patent Application No. DE 10 2005 040 473.1, filed on Aug. 26, 2005, the entire disclosure of which is incorporated by reference herein.

The present invention concerns a stereomicroscope. A stereomicroscope can be designed according to Greenough or as a telescope type with a main objective. The stereomicroscope is connected in a detachable manner to a focusing arm or incorporated in this.

BACKGROUND

Stereomicroscopes are used on the one hand to manipulate objects under visual observation and on the other to make fine object details visible. The object manipulation preferably takes place under low magnification and requires good 3D reproduction. For detail recognition rapid switching to high magnifications with high resolution is desired without change of instrument.

Stereomicroscopes provide two views of the object at various observation angles. If the angle between the two observation directions is unusually large, the object appears spatially distorted.

Numerous descriptions of the telescope type of stereomicroscopes appear in the literature: see also "Optical Designs for Stereomicroscopes", K-P. Zimmer, in International Optical Design Conference 1998, Proceedings of SPIE, Vol. 3482, pages 690-697 (1998) and U.S. Pat. No. 6,816,321. Stereomicroscopes with such a design include—apart from optional bolt-on modules—a main objective, which images the object at infinity, two downstream parallel telescopes for varying the magnification and two observation units comprising a tube lens, inverting system and eyepiece for visual observation with both eyes. The telescopes can be designed as changeable Galilean telescopes with fixed magnification or as a focal zoom systems. According to the prior art two identical telescopes are arranged symmetrically to a plane of symmetry of the device, wherein the plane of symmetry divides the object symmetrically into a right and a left half. The distance between the telescope axes is referred to as the stereo basis. The numerical aperture of this microscope is given by the semi-diameter of the entrance pupil of the telescope divided by the focal length of the main objective.

The numerical aperture of a microscope of this type is limited in the prior art. In order to increase the numerical aperture it is known to expand the entrance pupil diameters and thus the stereo basis which results in the disadvantage of large equipment dimensions, or to shorten the focal length of the main objective, thereby disadvantageously reducing the working distance and increasing the power required of the main objective excessively. In both cases the angle between the observation directions is expanded, resulting in increased spatial distortion.

U.S. Pat. No. 5,603,687 discloses an asymmetrical stereooptic endoscope, in which two objective systems with different diameters of the entrance pupils are arranged parallel next to each other. Both objectives produce images of the object on a sensor surface via light conductors or light fibers. From these CCD sensors for example, the image data are transmitted after digital processing to a monitor, that is to say they can be spacially perceived for example with a stereomonitor. It is stated that despite varying diameters of the two endoscopic channels the viewer perceives a stereoscopic image with a resolution and a brightness, as they result from the channel of larger diameter. The second channel of smaller diameter primarily serves to produce a stereoscopic vision or impression.

The conditions in the case of a stereomicroscope of the telescope type of the design as described above are in principle different than in the case of an endoscope in accordance with U.S. Pat. No. 5,603,687. Firstly, the viewing of the object takes place as a rule (at least also) directly with the eyes, without prior digital processing. Such digital processing will or can be used, if additionally documentation is to be made via connected cameras. It is not clear from the US document mentioned, how in the case of the embodiment disclosed there an object can be viewed directly visually. Furthermore, the projection onto a sensor surface (fixed focus) limits the depth of field of the display since the accommodation capacity of the eyes is out of action.

The magnification of an endoscope depends on the object distance. At high magnifications the object distance is normally minimal. In this case the overlap range of the fields of view of the two objectives being arranged next to one another is minimal. Therefore, stereoscopic viewing, which is only possible in the overlap range, is reduced in this case. At low magnifications however the overlap is large, but the numeric aperture is small, which results in high depth of field. Hence it follows that the image definition or quality of 3D objects only reduces slowly with the distance to the focus plane. This circumstance favours the merging of the two fields into a spatial image, in particular if the object depth is less than the depth of field.

A main component of a stereomicroscope of the type described is the telescope systems (discrete magnification changer or continuous zoom) in the two stereo channels. Telescope systems are not common in endoscopy. In the US document mentioned, therefore, a variation of the display scale or reproduction scale is not discussed.

For stereoscopic viewing the depth of field is important. In contrast to the stereoendoscope described above high power stereomicroscopes of the telescope type advantageously use the accommodation capacity of the eyes. A magnification variation takes place without changing the focusing of the equipment. There is no difference in the object clip between the right and the left field over the whole magnification range. The numeric aperture and thus the resolution of the stereomicroscope are adapted to the magnification and prevent empty magnifications. At high magnifications the depth of field is very small, in many cases smaller than the object depth in such arrangements. The image quality of 3D objects therefore considerably decreases with the distance to the focus plane. Thus, it cannot be assumed that the merging of the fields to a spatial image observed with a stereoendoscope under typically low magnification and high depth of field can be transferred to the conditions, which exist with a high power microscope in particular at high magnifications, if the stereoscopic channels due to different apertures produce images of different resolution and depth of field.

A further, not to be neglected criterion is that of the image brightness, which is different in the case of the US document mentioned, due to the different entrance pupil diameters of the endoscopic channels. Here the digital processing of images has the advantage that both fields can be shown equally brightly on the monitor after corresponding correction. Such corrections are not possible in the case of direct visual viewing, as is the case with stereomicroscopes.

Furthermore, it would be detrimental with an arrangement discussed above, if the higher power of one of the stereoscopic channels could not be used by a user having eyes of different capability, if the stereoscopic channel of higher power was assigned to the eye of lower capability.

SUMMARY

An object of the present invention is to provide a stereomicroscope of the telescope type which allows users, particularly those having differing capabilities in both eyes to benefit from a gain in the resolution in one channel without converting the device. A further aspect of the invention is to allow a binocular, non-stereoscopic observation perpendicularly to the object plane.

The present invention provides a stereomicroscope of the telescope type comprising a first beam path and a second beam path, wherein in the first beam path a first telescope system is provided and in the second beam path a second telescope system is provided, and wherein an observation unit comprising a first and a second observation unit is provided, characterised in that at least one optical element of the first telescope system compared to at least one corresponding optical element of the second telescope system has a larger optically effective diameter and in that between the first telescope system and the second telescope system and the first and the second observation units a prism group is provided, which can be moved in the beam path of the first telescope system with the larger optically effective diameter and supplies this beam path to the two observation units.

Because with such a design with active prism groups as a result of the observation by only one channel the object is seen slightly at an angle from the side, it is advantageous to be able to switch easily and simply from this type of observation to binocular, non-stereoscopic observation perpendicularly to the object plane. This perpendicular observation is also particularly advantageous for documentation and all the more for taking image stacks for 3D capture.

The stereomicroscope according to the invention has, on the one hand, at low magnifications as a result of a lower numerical aperture a large depth of field and allows a good 3-dimensional reproduction and has, on the other hand, at high magnifications a high aperture and thus offers a high resolution without generating empty magnifications, that is to say rising magnifications without increasing resolution.

The stereomicroscope according to the invention comprises a first beam path and a second beam path, wherein in the first beam path a first telescope system is provided and in the second beam path a second telescope system is provided, and wherein an observation unit consisting of a first and a second observation unit is provided. At least one optical element of the first telescope system compared to at least one corresponding optical element of the second telescope system has a different optically effective diameter. Between the first telescope system and the second telescope system and the first and second observation units a prism group is provided which can be moved in the beam path of the first telescope system with the larger optically effective diameter, resulting in a larger diameter of the entrance pupil, and supplies this beam path to the two observation units.

The prism group can be manually displaceable. The prism group can also conceivably be displaced by electromotor or electromagnetically. For at least one magnification setting or one zoom range—preferably at high magnifications—and at the same magnification of the telescope systems the diameter of an entrance pupil of the first telescope system is more than 10% larger than the diameter of the entrance pupil of the second telescope system.

The optical elements of the first telescope system or the second telescope system are lens elements or diaphragms (iris diaphragms).

At the same magnification setting of the two telescope systems, which is a pre-requisite of stereoscopic viewing, the diameter of the entrance pupil of the first telescope system is preferably 10-50% larger than the diameter of the entrance pupil of the second telescope system.

In a stereomicroscope, an adjustment element is provided for variation of magnification, which element brings different pairs of telescopes to operation or effects a synchronous movement of zoom groups. A coupling with the operation of the adjustment element may be provided, which brings the prism group into the operated position, as soon as the entrance pupil diameters of the first and second telescope systems become different.

In a further embodiment of the invention the magnification ranges of the first and second telescope systems are of different sizes, so that the telescope system with the larger entrance pupil diameter allows higher magnifications. The prism group is brought into the operated position, as soon as the two telescope systems do not have a common magnification. An increase of magnification of one of the telescope systems can, for example, be stopped at a particular value or a telescope system of fixed magnification (including zero) can be used, and the prism group is then (automatically) brought into the operated position, if the magnification of the other telescope system becomes larger than the magnification of said first telescope system, with the effect that the image of the telescope system having the higher magnification (and resolution) is provided to both eyes of the user.

In a second embodiment of the prism group for an unchanged position of the object and the main objective the first and the second telescope systems and the observation units are displaced if the prism group is brought into the operated position and in this way a binocular observation of the object perpendicularly from above is brought about.

In a further embodiment of the prism group for an unchanged position of the object, main objective and observation unit the first and second telescope systems are displaced if the prism group is brought into the operated position and in this way a binocular observation of the object perpendicularly from above is brought about without the position of the observation unit being changed.

Further advantageous modifications of the invention can be found in the claims.

BRIEF DESCRIPTION OF THE DRAWINGS

The present invention is shown schematically and is described in more detail below with reference to the drawings, in which:

FIG. 7 shows a view of the prisms from FIG. 6, but in the position of the perpendicular, binocular observation.

DETAILED DESCRIPTION

Figure 1:
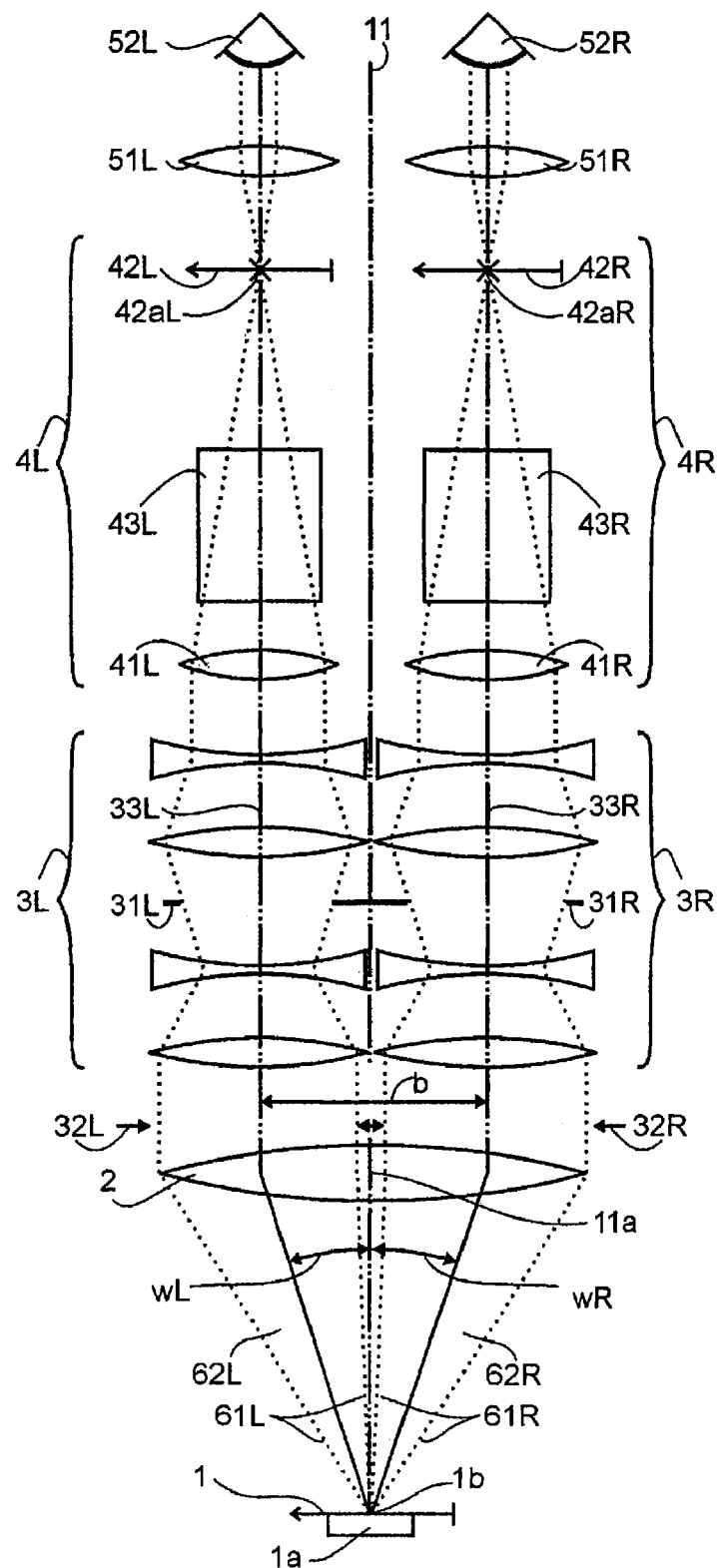
FIG. 1 shows a schematic diagram of the optical design of a stereomicroscope of the telescope type according to the prior art.

FIG. 1 is a schematic diagram of the optical design of a stereomicroscope of the telescope type according to the prior art. The object plane 1 is in the front focal plane of the main objective 2. The object 1a to be investigated or observed is also located in the object plane. In the object plane 1 the object centre 1b is marked by a vertical line 11. The optical axis 11a of the objective 2 coincides with the vertical line 11. In the following the arrangement of the design of the optical system will be described in the direction of a user. The user detects the image of the object 1a with his eyes 52R and 52L. The objective 2 has a first and second telescope system 3R and 3L downstream, which are identical in design. The first and second telescope systems 3R and 3L are arranged symmetrically to the vertical line 11 or to the optical axis 11a. The telescope systems 3R and 3L are shown as a focal zoom systems. These systems are, for example, described in U.S. Pat. No. 6,816, 321. In the zoom systems diaphragms or iris diaphragms 31R and 31L are arranged. The diameters of the iris diaphragms 31R and 31L are adjustable and have the same setting on both sides. These limit the diameters 32R and 32L of the entrance pupils, which are of variable size according to the zoom setting and diaphragm selection but are the same on both sides. The first and second telescope systems 3R and 3L define a first and a second optical axis 33R and 33L respectively. The distance between the optical axes 33R and 33L is referred to as the stereo basis b. On the first and second optical axes 33R and 33L the telescope systems 3R and 3L are subordinate to the first and second observation units 4R and 4L, which are each arranged symmetrically to the vertical line 11. The first and second observation units 4R and 4L comprise identically designed tube lenses 41R and 41L, which generate the intermediate images 42R and 42L, symmetrical inverter systems 43R and 43L for image erecting and eyepieces 51R and 51L. The user detects the image of the object with his eyes 52R and 52L. Optionally in a known fashion further modules can be introduced into the beam path such as attachment lenses, filters, polarisers, reflected illumination units, beam splitting systems for light coupling and decoupling, and so on. The imaging by such a microscope is shown by a schematic representation of the marginal beams 61R and 61L of a beam path, which in the example originates from the object centre 1b. The marginal beams 61R and 61L identify the two light pencils 62R and 62L used by the microscope. As shown in FIG. 1, the respective light pencils 62R and 62L are limited by the diameters 32R and 32L of the entrance pupils, which for their part are determined by the iris diaphragms 31R and 31L. Since the object 1a is arranged in the front focal plane of the objective 2, the marginal beams run parallel between the objective 2 and the zoom. Therefore, it is possible in a simple manner to determine the diameters 32R and 32L of the entrance pupils. The marginal beams leave the zoom parallel again. Therefore, the area behind the zoom is advantageous for optional accessories. The tube lenses 41R and 41L each focus the pencil of rays on a point 42aR, 42aL in the plane of the intermediate images 42R and 42L. This point 42a R, 42aL is located in the front focal plane of the ocular 51R or 51L and is imaged by this at infinity, so that it can be observed with the eyes 52R and 52L. Further, it can be seen from FIG. 1 that the angles wR and wL at which the observer perceives the object 1a with the right or left eye 52R, 52L, are the same.

As stated in U.S. Pat. No. 6,816,321 the resolution of the microscope is given by:

$$\text{Resolution} = 3000 * nA \, [L_p/\text{mm}] \qquad \text{Equation 1}$$

where $L_p/\text{mm}$ stands for line pairs per millimeter and nA is the numerical aperture which in the present case is given by $$nA = EP/(2*\text{focal length of the objective 2}) \qquad \text{Equation 2}$$

where EP is the diameter of the entrance pupil of the telescope system.

Finally the depth of field T is again of significance. A practical relationship is given by:

$$T[\text{mm}] = \lambda/(2*nA^2) + 0.34 \, \text{mm}/(Vtot*nA) \qquad \text{Equation 3}$$

where $\lambda$=light wavelength of approx. 550 E-6 mm and Vtot=microscope magnification including ocular magnification.

Figure 2:
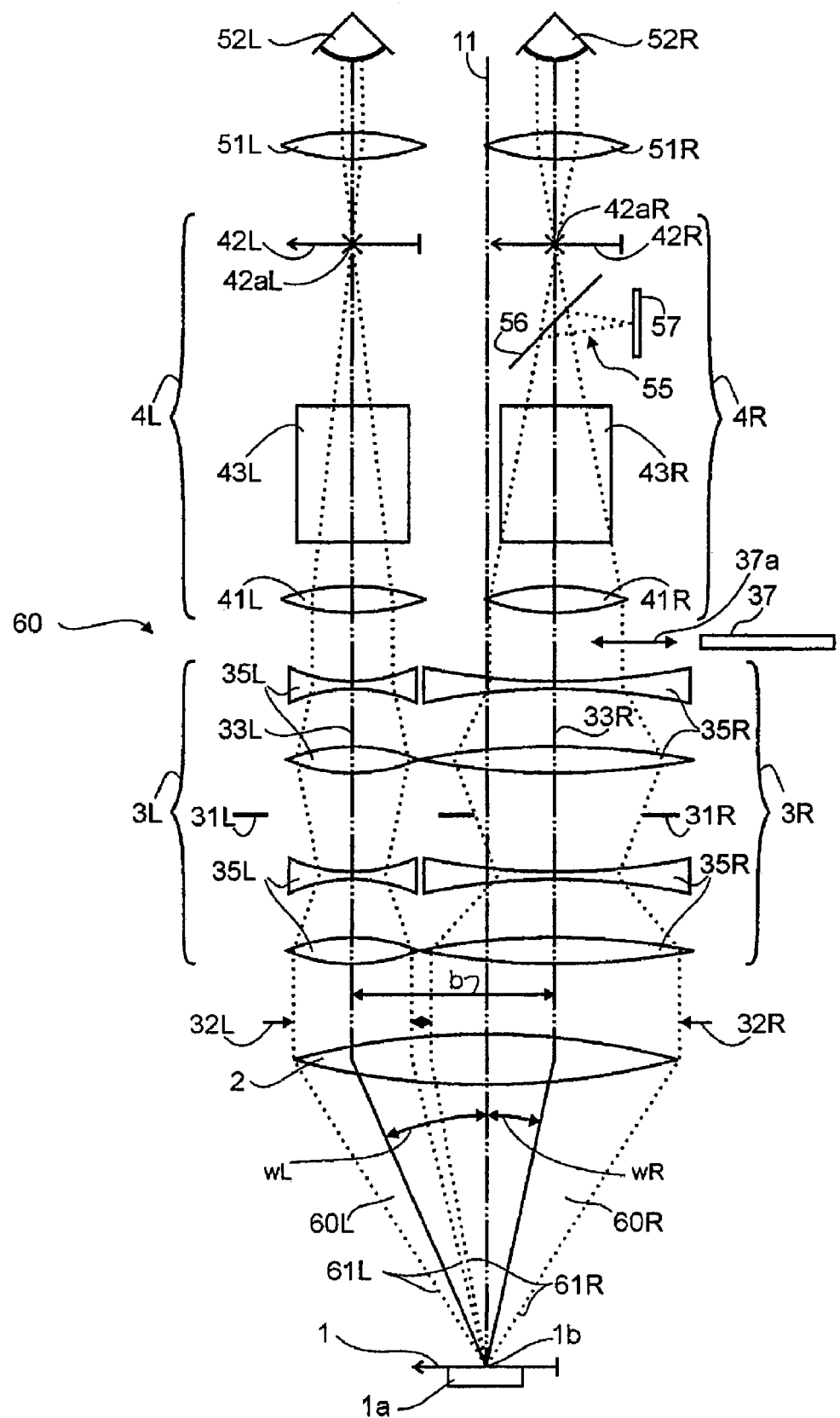
FIG. 2 shows a schematic diagram of the design of an asymmetrically constructed stereomicroscope.

FIG. 2 is a schematic diagram of the construction of an asymmetrically constructed stereomicroscope. The main objective, the stereo basis and the observation units are unchanged. Optical elements, which are identical to elements in FIG. 1, are referred to by the same references. The position of maximum magnification of the zoom system is shown. It can be seen that the diameter of the right beam path 60R is larger than that of the left one 60L, in this example larger than the stereo basis b.

The stereomicroscopes of the telescope type are equipped with a magnification changer which can be designed as a step changer or zoom system. The two telescopes or telescope systems 3R and 3L are according to the invention no longer built symmetrically but are different, in particular, however, at least with different maximum diameters of the first entrance pupil 32R and the second entrance pupil 32L. Advantageously, the maximum diameter of the entrance pupils 32R or 32L of one telescope system 3R or 3L is 10-50% larger than that of the other telescope system 3R or 3L. The invention is particularly effective if the larger of the two diameters of the entrance pupils 32R and 32L is larger than the stereo basis b, which is possible if the diameter of the entrance pupils 32R or 32L of one telescope system 3R or 3L is smaller than the stereo basis b. The magnification changers or the zoom systems of the two telescope systems 3R and 3L can be designed in such a way that in the wide range of smaller microscope magnifications the diameters of the entrance pupils 32R and 32L of the two telescope systems 3R or 3L are virtually identical, but for high magnifications are different. By means of this asymmetrical arrangement the resolution in one channel can be increased without the disadvantages described above.

In the case of the unsymmetrical diameters of the entrance pupils 32R and 32L the user receives two partial images of differing brightness, differing resolution and differing depth of field. It has been shown that a difference in brightness of up to 50% and the differences in the detail recognition do not adversely affect the merging of the two partial images into a 3-dimensional image. On the contrary, surprisingly the object is perceived 3-dimensionally with the improved resolution resulting from the higher numerical aperture and the greater depth of field resulting from the lower aperture. The invention is based on the utilisation of this physiological phenomenon for the design of asymmetrical stereomicroscopes.

While in the first beam path 60R the pencil diameter is determined by the diameter of the iris diaphragm 31R, limitation of the second beam path 60L is by means of the diameter of the lens element 35L between objective 2 and diaphragm 31L. The objective 2 has a first and a second telescope system 3R and 3L which do not have the same design downstream of it. The optical elements 35R, 31R of the first telescope system 3R have a different diameter from the optical elements 35L, 31L of the second telescope system 3L. The telescope systems 3R and 3L are shown as a focal zoom systems.

The arrangement of the telescope systems 3R and 3L (right and left) can comprise different component parts. Here it should be noted that in the operated condition the rule of equal magnification applies.

A further possibility for the design of the first and second telescope systems 3R and 3L is for the first and second telescope systems 3R and 3L (right and left) to be designed with a "same construction", wherein, however, the optically effective diameter of at least one of the optical elements or a lens component is unsymmetrical, that is, for example, only the diameter of a (first) lens group of one of the telescopes is larger than the diameter of the corresponding lens group of the other telescope, all other lens parameters remaining the same. The term "optically effective diameter" means the diameter which describes the pencil of rays contributing to the image generation when it hits an optical element and penetrates the optical element. The first and second telescope systems 3R and 3L can be designed as Galilean telescopes for stepped magnification selection or as zoom systems for continuous magnification selection.

Similarly the design of the first and the second telescope systems 3R and 3L (right and left) each with a diaphragm or iris diaphragm 31L, 31R is conceivable. Here, the first diaphragm 31R in the first telescope system 3R can be operated independently of the second diaphragm, 31L in the second telescope system 3L.

In a further embodiment of the diaphragm setting the operation of the diaphragms 31R, 31L is set in such a way that in a first setting the ratio of the diaphragm openings between the first telescope system 3R and the second telescope system 3L is set. In a second setting both diaphragm openings, with the ratio unchanged, are varied simultaneously.

Similarly, through the introduction of a light filter (e.g. neutral density stage or graduated filter) into the beam path with the larger diameter of the entrance pupils the differences in brightness resulting from the diameter differences can be reduced or eliminated. Here, the filter is advantageously arranged between the main objective and the telescope system, in the telescope system or between the telescope system and the ocular. The filter 37 can be operated manually and introduced into the first beam path 60R along the double arrow 37a. It is likewise possible for the filter 37 to be varied by an operation controlled by the magnification selection. The operation does not adversely affect the resolution or the depth of field.

In a further embodiment the stereomicroscope is provided with an in itself known documentation port 55. By arranging a beam splitter 56 or a decoupling device in the first beam path 60R with the larger diameter of the entrance pupil 32R the decoupling is achieved. Thus, the high resolution of the documentation device 57 is made available. The documentation device 57 is a conventional CCD camera.

Further, the magnification changer (the first and the second telescope system 3R and 3L) can be designed to swivel around its longitudinal axis, so that the beam path with the larger diameter of the entrance pupils 32R can optionally be supplied to the right or the left user eye 52R or 52L.

Figure 3:
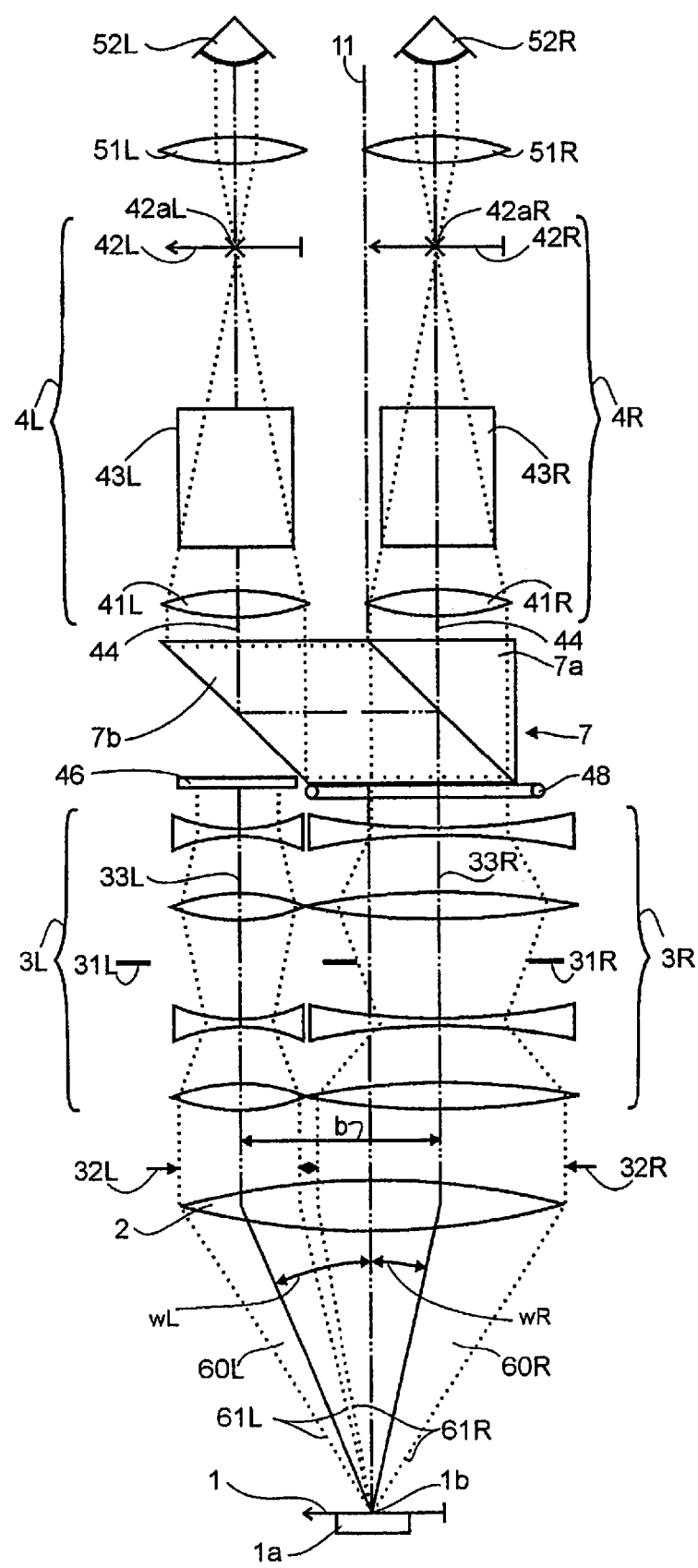
FIG. 3 shows a modification of the asymmetrical stereomicroscope from FIG. 2.

FIG. 3 is a modification of the asymmetrical stereomicroscope from FIG. 2. Between the magnification changer 3 (the first and second telescope systems 3R and 3L) and observation unit 4 (the first and second observation units 4R and 4L) a prism group 7 is introduced, which splits the light of the right channel (60R) and supplies this to the two inputs 44 of the first and second observation units 4R and 4L. For this purpose a right side 7a of the prism group 7 is in a known way designed as a beam splitter and the left side 7b of the prism group 7 as a deviating prism. Prism group 7 advantageously has a cover 46 attached which in the operated position covers the left channel 60L. The prism group 7 can by way of example be secured to a carriage 48 which is displaced perpendicularly to the plane of projection, in order to bring the prism group 7 into the operated position or to remove it from the beam path. Once the prism group 7 has been removed the arrangement is identical to the arrangement described in FIG. 2. In the operated position of the prism group 7 both eyes 52L and 52R are provided with identical images. This guarantees that the high detail recognition can also be used for users whose eyes are not equally good. The image impression is no longer stereoscopic, but at high magnifications, because of the low depth of field and the priority of high detail recognition, this is not a disadvantage.

The carriage 48 with the prism group 7 can be operated mechanically, by electromotor or electromagnetically, wherein control is particularly through the magnification adjustment. In particular, by use of electromagnets or a pair of these the power feed or the polarisation of the magnets can be easily controlled through an encoder on the axis of the magnification adjustment device and switching can take place in a pulsed manner in a very short space of time.

While the effectiveness of the prism group 7 is at its most advantageous at high magnifications, the prism group 7 can also bring about a desired change from stereoscopic (i.e. spatial) to binocular observation (in the sense of non-spatial observation with both eyes) at other magnification settings.

FIG. 3 shows how the object 1a is observed in a binocular fashion at an angle wR. On the other hand, the stereoscopic observation corresponds to a view virtually perpendicular from above. When switching takes place, therefore, a slightly lateral observation of the object 1a for the user results.

Figure 4:
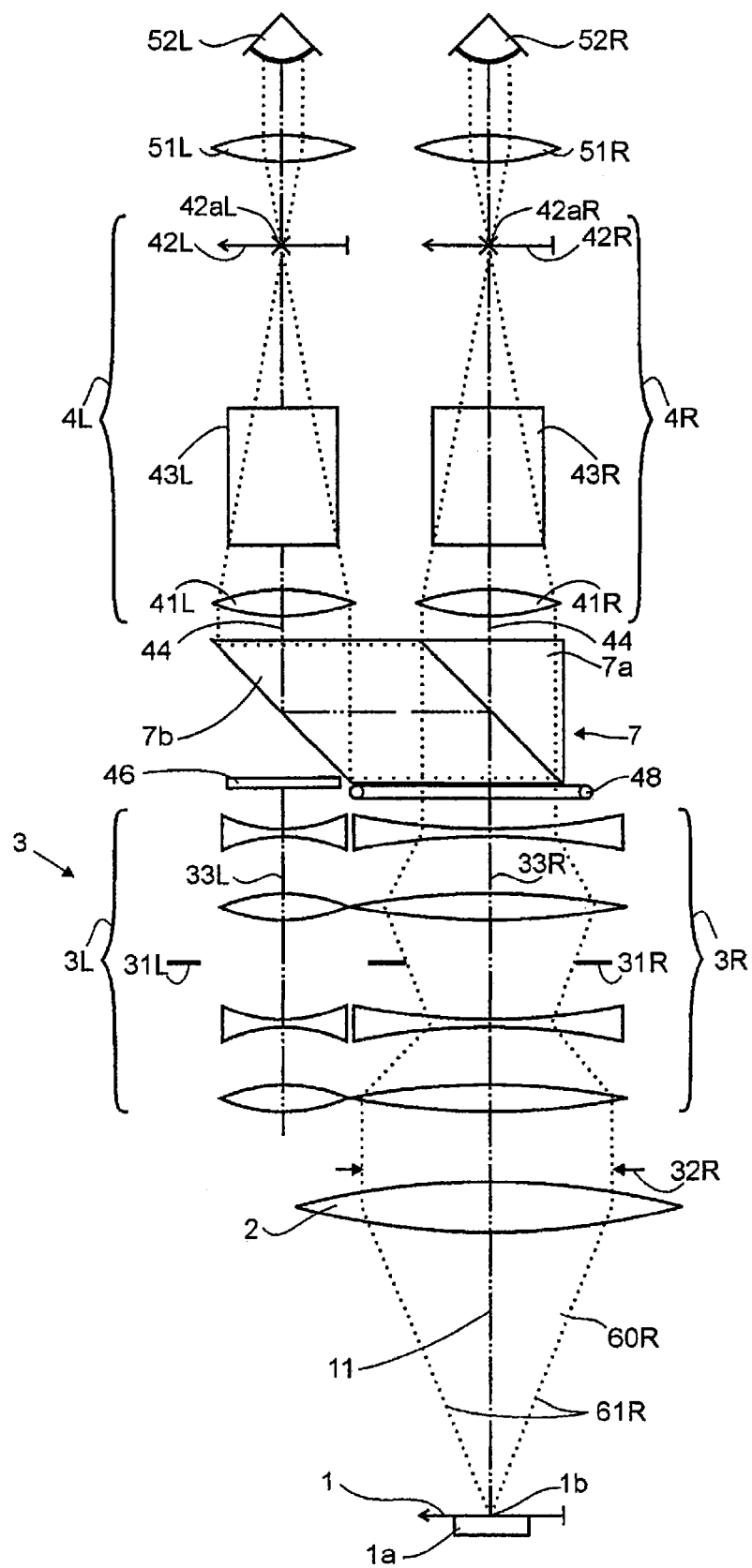
FIG. 4 shows a first further development of the arrangement according to FIG. 3.

FIG. 4 shows a first further development of the arrangement according to FIG. 3. The magnification changer, the prism group 7 and the observation units 4R and 4L are displaced laterally to the left, so that the axis 33R of the channel 60R coincides with the larger diameter 32R of the entrance pupil of the magnification changer or the first telescope system 3R with the axis 11 of the main objective 2. The prism group 7 is in the operated position and, as described above, allows a binocular observation perpendicular to the object plane 1. Switching units for lateral displacement of magnification changers and observation units are known from units with an "AX position" (monocular perpendicular observation of the object, by just one channel of the stereomicroscope). Securing of the carriage 48 with the prism group 7 to the sliding unit 110 (see FIG. 5) takes place in a known fashion. A possible design of the switching unit can be obtained from a simplification from FIG. 5.

Figure 5:
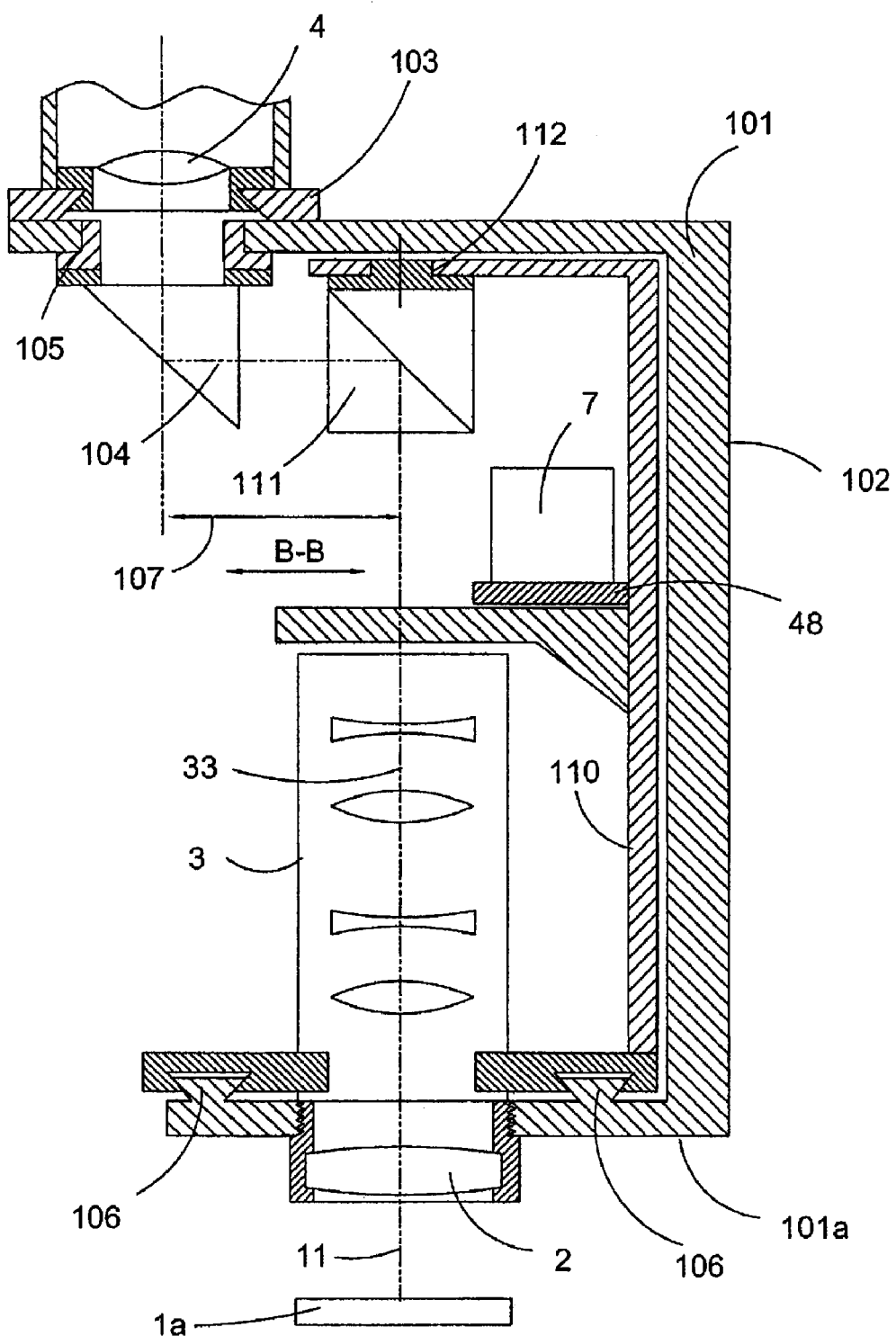
FIG. 5 shows a schematic diagram of the arrangement of the prism group, which brings about a binocular observation perpendicularly from above on the object.

FIG. 5 shows a further development of the switching unit, which brings about a binocular observation perpendicularly from above of the object 1a without changing the position of the observation unit 4. A side view of an arrangement according to this embodiment of the invention is shown.

The switching unit comprises a first C-shaped carrier 101, the rear 102 of which is used for securing the microscope. The main objective 2 is fitted to the underside 101a of the carrier 101. The top constitutes the connection 103 for the observation unit 4. Opposite this connection inside on the carrier 101 two half-square prisms 104 are arranged to rotate around the pivot bearing 105. On the inner underside of the carrier 101 a linear guide 106 is formed which allows a second C-shaped carrier 110 to be displaced laterally. The carrier 110 holds the magnification changer 3. The carrier 110 is slid in such a way that starting from the stereo position the axes of the beam path with the larger diameter 32R of the entrance pupil of the first telescope system 3R of the magnification changer 3 and the axis 11 of the main objective 2 are brought to coincidence. At the top of the carrier 110 inside, two half-square prisms 11 are arranged to rotate in the extension of the optical axes 33 of the magnification changer 3 in the stereo setting 112 identifies the pivot bearing. In the stereo setting the half-square prisms 104 and 111 are aligned with each other in such a way that they divert the two optical axes 33R and 33L of the magnification changer into the observation units 4R and 4L.

Further, on the carrier 110 the carriage 48 with the prism system 7 is arranged to slide perpendicularly to the direction of movement of the carrier 110. The direction of sliding is shown by the double arrow B-B. If the carrier 110 is moved to the side, a sliding of the carriage 48 with the prism group 7 can take place as described, e.g. by electromagnets, controlled by the movement of the carrier 110 in relation to the carrier 101. The sliding of the carrier 101 can in turn take place by hand or coupled with the magnification selection as described for the carriage 112 above in relation to FIG. 3.

Figure 6:
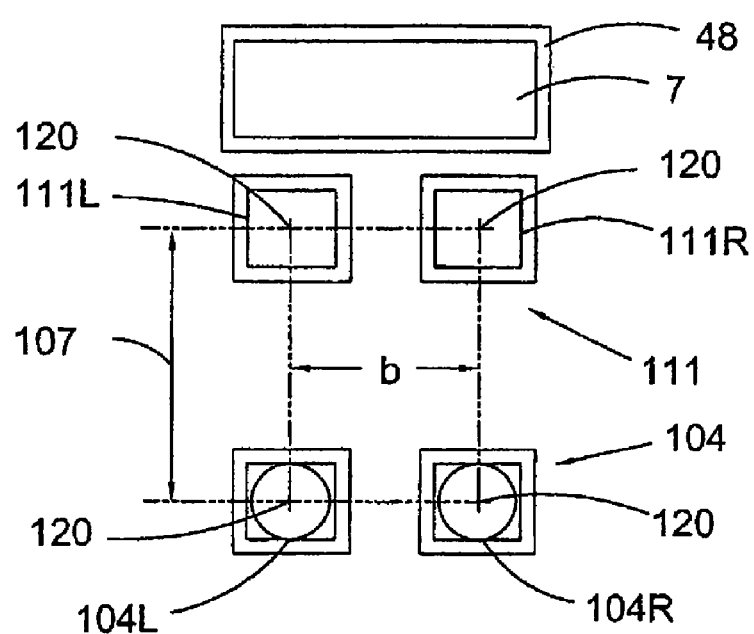
FIG. 6 shows a view of the prisms of the arrangement from FIG. 5 in the stereo position.

FIG. 6 shows a view of the prisms with the arrangement from FIG. 5 in the stereo position. The prism group 7 is not in the operated position. The pair of prisms 111, comprising a first prism 11R and a second prism 11L, and the prism pair 104, comprising a first prism 104R and a second prism 104L, bring about a parallel offset 107 of the optical axes 33R and 33L of the first telescope system 3R and the second telescope system 3L. The pivots 120 of each pair of prisms are the distance of the stereo basis b apart.

FIG. 7 shows a view of the prisms, but in the position of the perpendicular, binocular observation. The carrier 110 is moved to the side and the carriage 48 is pushed to the front, so that the prism group 7 is in the operated position. The right side of the prism group 7 is, as described above, designed as a beam splitter. The entrance axis of the prism group 7 and the optical axis 33R of the right channel coincide. The axes of rotation of the prisms 104 are in the same location. Since due to the sliding of the carrier 100 the exit axes of the prism group 7 have been displaced laterally to the entrance axes of the observation units 4, the prism pairs 111R and 111L and 104R and 104L are rotated as shown, in order to compensate for the lateral offset. The rotation of the prisms can be easily coupled and synchronised with the sliding of the carrier 110 in relation to the carrier 101, e.g. with a U-shaped bar system 121, as shown schematically in FIG. 7.

It can be seen from FIGS. 5-7 that the optical axes of the observation units 4R and 4L, in relation to the optical axes of the telescope systems 3R and 3L, are offset perpendicularly to the plane in which the axes of the telescope systems are located. The offset is shown in the direction of the user, the offset 107 can, however, also be in the opposite direction.

An arrangement according to FIG. 4 or 5 can be used in order to change from stereo observation to binocular observation at any magnification setting.

In a further design of the invention the magnification ranges of the two telescope systems 3R and 3L are different. Preferably at a high magnification, for example, only one telescope system 3R can be present and the other telescope system 3L can be dispensed with. Using zoom systems, a movement of zoom groups of only one zoom system 3R can be established starting from a particular magnification of higher values without the zoom groups of the other zoom system 3L following synchronously. Only by using the telescope system 3R with the larger entrance pupil diameter can a high magnification be achieved. The prism system 7 is then brought into the operated position, if the second telescope system 3L does not allow a magnification corresponding to the first telescope system 3R. The image impression is no longer stereoscopic, but at high magnifications, because of the low depth of field and the priority of high detail recognition, this is not a disadvantage.

What is claimed is:

1. A telescopic stereomicroscope comprising:
   a first beam path;
   a second beam path;
   a first telescope system disposed in the first beam path and having at least one first optical element;
   a second telescope system disposed in the second beam path and having at least one second optical element corresponding to the at least one first optical element, wherein the at least one first optical element has a larger optically effective diameter than the corresponding at least one second optical element;
   a binocular observation unit configured for first and second eyes of a user including a first observation unit corresponding to the first eye of the user and a second observation unit corresponding to the second eye of the user; and
   a prism group disposed between the first and second telescope systems and the binocular observation unit, the prism group being movable into an operating position in the first and second beam paths so as to supply the first beam path to the first and second observation units and removable out of the operating position.

2. The telescopic stereomicroscope as recited in claim 1, wherein the prism group is manually displaceable.

3. The telescopic stereomicroscope as recited in claim 1, wherein the prism group is at least one of displaceable via electromotor and electromagnetically displaceable.

4. The telescopic stereomicroscope as recited in claim 1, wherein the at least one first optical element and the at least one second optical element include at least one of a lens element and a diaphragm.

5. The telescopic stereomicroscope as recited in claim 1, wherein a diameter of an entrance pupil of the first telescope system is at least 10% larger than a corresponding diameter of an entrance pupil of the second telescope system for at least one magnification setting or one zoom range and at a same magnification of the first and second telescope systems.

6. The telescopic stereomicroscope as recited in claim 5, wherein the at least one magnification setting corresponds to a high magnification.

7. The telescopic stereomicroscope as recited in claim 5, wherein the diameter of the entrance pupil of the first telescope system is 10-50% larger than the corresponding diameter of the entrance pupil of the second telescope system.

8. The telescopic stereomicroscope as recited in claim 1, further comprising an adjustment element configured to adjust a magnification of the first and second telescope systems and wherein an operation of the adjustment element brings the prism group into the operated position, if an entrance pupil diameter of the first telescope system is different than an entrance pupil diameter of the second telescope system.

9. A telescopic stereomicroscope comprising:
   a first beam path;
   a second beam path;
   a first telescope system disposed in the first beam path;
   a second telescope system disposed in the second beam path, wherein at least one magnification of the first telescope system is greater than a magnification of the second telescopes system;

a binocular observation unit configured for first and second eyes of a user including a first observation unit corresponding to the first eye of the user and a second observation unit corresponding to the second eye of the user; and a prism group disposed between the first and second telescope systems and the binocular observation unit, the prism group being movable into an operating position in the first and second beam paths so as to supply the first beam path to the first and second observation units and removable out of the operating position.

10. The telescopic stereomicroscope as recited in claim 9, wherein prism group is configured to be brought into the operated position automatically at the at least one first magnification.

11. The telescopic stereomicroscope as recited in claim 9, further comprising an object and a main objective, and wherein the first and the second telescope systems and the first and second observation units are displaced when a position of the object and the main objective is unchanged and if the prism group is brought into the operated position so as to enable a binocular observation of the object perpendicularly from above.

12. The telescopic stereomicroscope as recited in claim 9, further comprising an object and a main objective, and wherein the first and the second telescope systems are displaced when a position of the object, the main objective and the first and second observation units is unchanged and if the prism group is brought into the operated position so as to enable a binocular observation of the object perpendicularly from above.

13. The telescopic stereomicroscope as recited in claim 9, wherein the first and second observation units, and the first and second telescope systems each define a respective optical axis, and wherein the optical axes of the observation units have an offset relative to the optical axes of the first telescope system and the second telescope system.

14. A telescopic stereomicroscope comprising:

a first beam path;

a second beam path;

a first telescope system disposed in the first beam path and having at least one first optical element;

a second telescope system disposed in the second beam path and having at least one second optical element corresponding to the at least one first optical element, wherein the at least one first optical element has a larger optically effective diameter than the corresponding at least one second optical element;

a first observation unit;

a second observation unit;

a prism group disposed between the first and second telescope systems and the first and second observation units, the prism group being displaceable in the first beam path to an operated position so as to supply the first beam path to the first and second observation units; and an adjustment element configured to adjust a magnification of the first and second telescope systems and wherein an operation of the adjustment element brings the prism group into the operated position, if an entrance pupil diameter of the first telescope system is different than an entrance pupil diameter of the second telescope system.

* * * * *